G. A. VAN VORST.
AUTOMOBILE FENDER.
APPLICATION FILED JUNE 24, 1913.
1,106,121.
Patented Aug. 4, 1914.
3 SHEETS—SHEET 2.
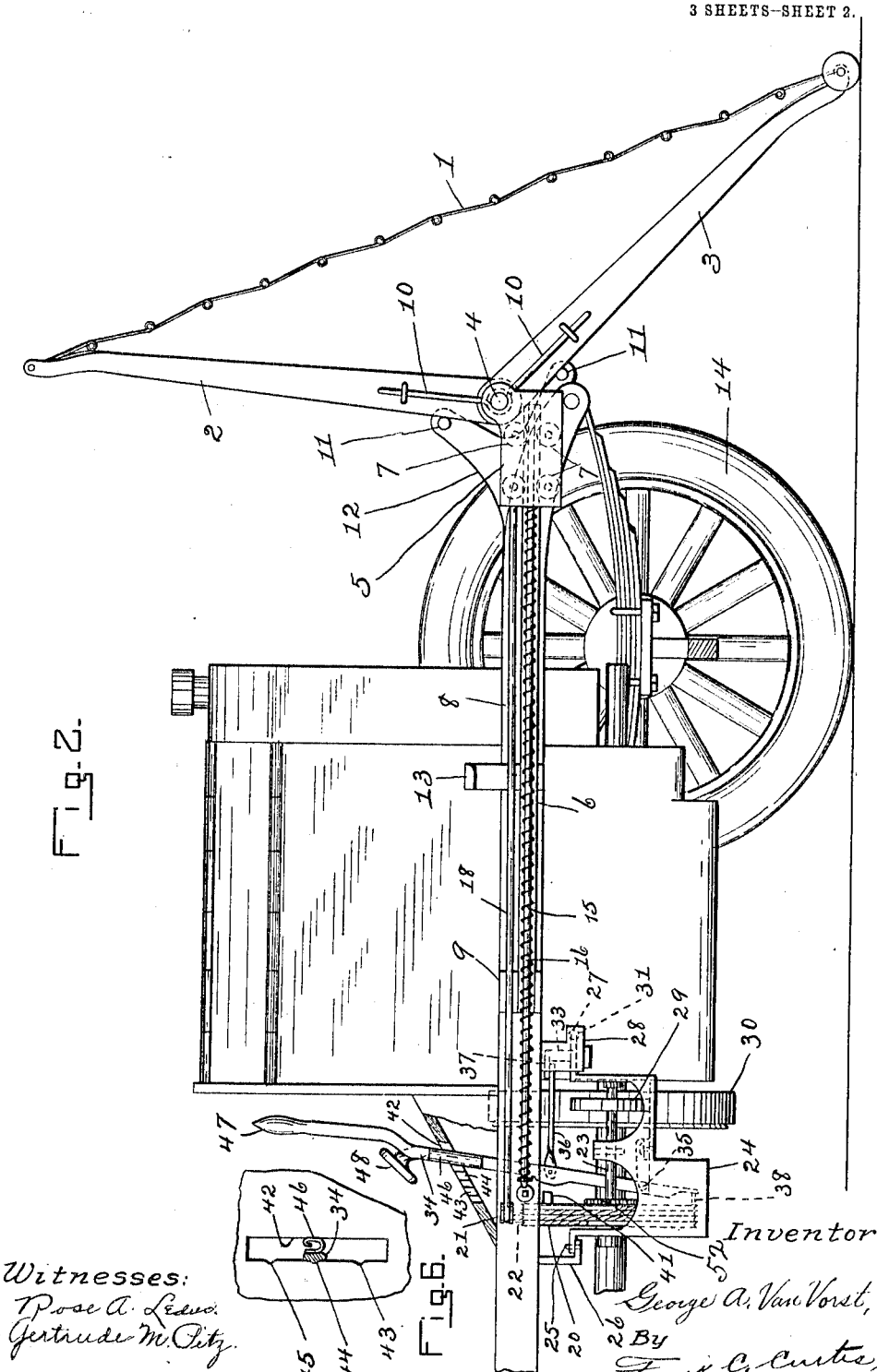

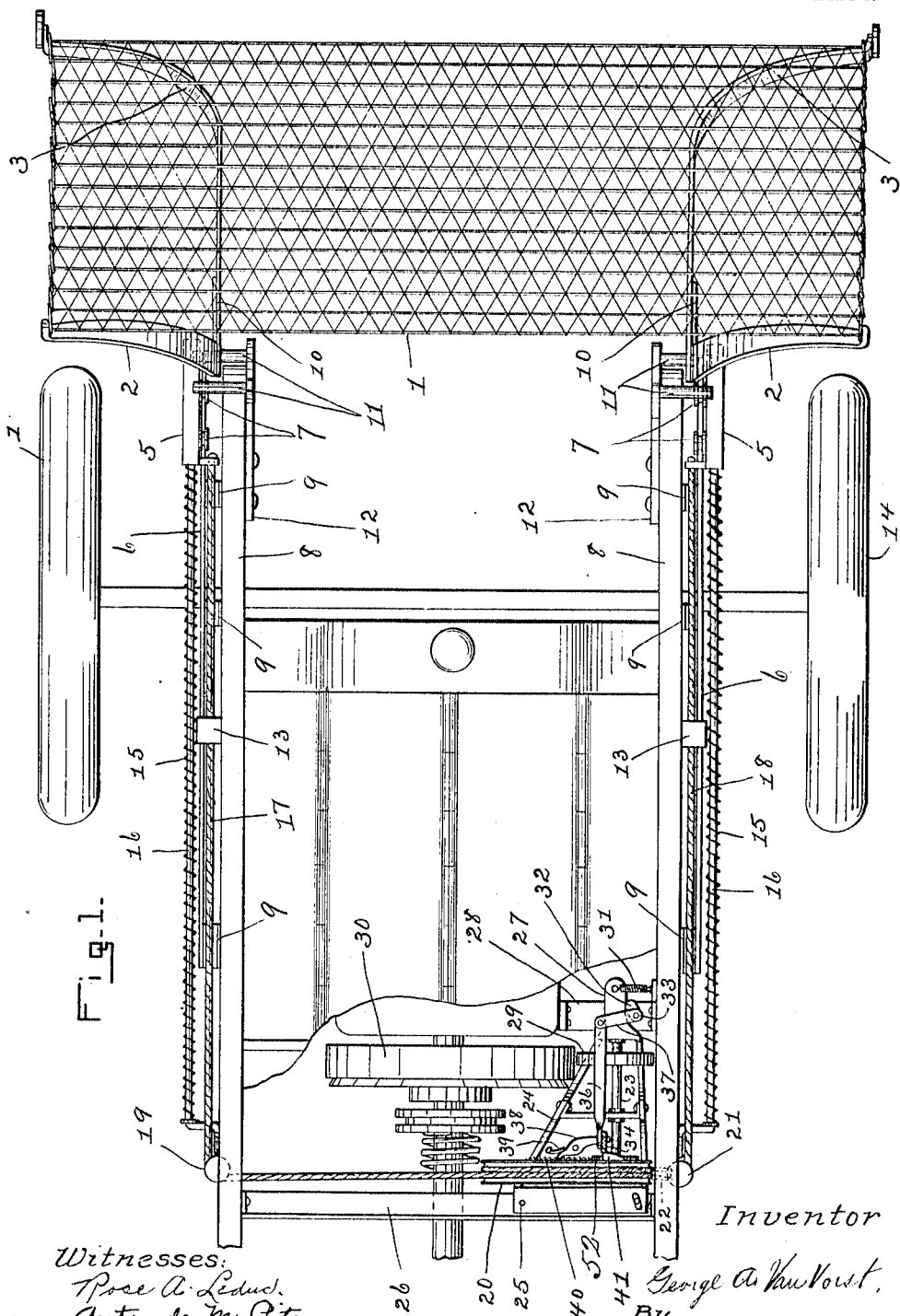

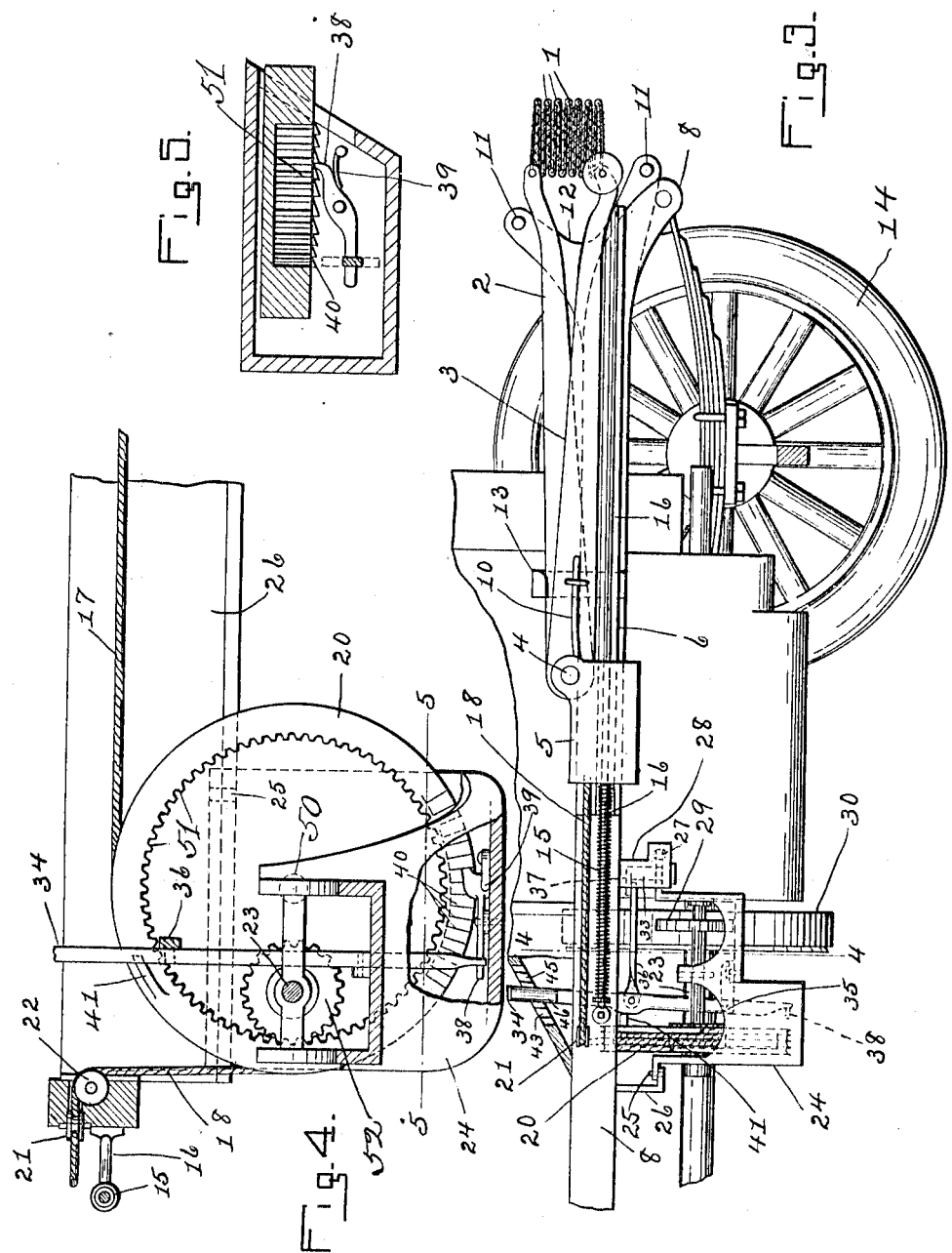

GEORGE A. VAN VORST, OF SCOTIA, NEW YORK.

AUTOMOBILE-FENDER.

1,106,121.

Specification of Letters Patent.

Patented Aug. 4, 1914.

Application filed June 24, 1913. Serial No. 775,505.

*To all whom it may concern:*

Be it known that I, GEORGE A. VAN VORST, a citizen of the United States, residing at Scotia, county of Schenectady, and State of New York, have invented certain new and useful Improvements in Automobile-Fenders, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

Figure 1 of the drawings is a top plan view of the front end of an automobile provided with my improved fender mechanism, showing the fender extended. Fig. 2 is a view in side elevation of the same. Fig. 3 is a view similar to Fig. 2, showing the fender withdrawn and folded. Fig. 4 is a vertical cross-section of the same taken on the broken line 4—4 in Fig. 3. Fig. 5 is a horizontal cross-section of the same taken on the broken line 5—5 in Fig. 4. Fig. 6 is a plan view of a broken-away portion of the floor or dashboard showing the slot within which the controlling lever of the fender-mechanism plays, the lever being shown in cross-section.

The principal objects of the invention are to support upon the frame or body of an automobile, a fender in compact form adapted to be extended and expanded at the will of the operator to form a shield in advance of the forward end of the vehicle; and to employ the engine of the vehicle as a means for withdrawing and folding the fender mechanism.

Other objects will appear in connection with the following description.

Referring to the drawings wherein the invention is shown in preferred form, the fender proper comprises a flexible shield or netting, 1, mounted at each end upon a pair of arms, 2 and 3, pivoted at 4, upon a carriage, 5 movable longitudinally of the vehicle along a track 6, upon which the carriage, 5, is mounted by means of grooved rollers, 7. The track, 6, is mounted upon the neighboring side bar, 8, of the vehicle by means of brackets, 9, placed at suitable intervals.

A coil-spring, 10, encircling the pivotal connection, 4, tends to spread the arms, 2 and 3, to the limit permitted by a pair of horizontal pins, 11, projecting from a bracket, 12, bolted to the neighboring side bar. The pins, 11, are so located that they serve to engage the rear side of the arms, 2 and 3, to automatically fold the same toward each other as the carriage, 5, is drawn along the track, 6, toward the rear of the vehicle, and this folding operation is assisted by a bracket, 13, fixed upon the side bar, 8, in position to engage the upper arm, 2, as the carriage approaches its rearmost position, as shown in Fig. 3.

A forward movement of the carriage, 5, from the position shown in Fig. 3 to that shown in Fig. 2, permits the fender arms, 2 and 3, to be spread or opened out by the springs, 10, in which extended position the arms, 2, project substantially vertically upward, and the arms, 3, obliquely forward and downward approximately to the ground; and across the angle formed by the arms, 2 and 3, the flexible netting, 1, is stretched. The forward ends of the arms, 2 and 3, are curved outwardly to give sufficient lateral spread for the netting, 1, to serve as a fender for the front wheels, 14, of the vehicle. Each lateral edge of the netting, 1, is yieldingly supported by a multiple coil-spring, comprising a piece of spring-wire coiled alternately in opposite directions, tending to automatically fold to a compact zig-zag form as shown in Fig. 3, but adapted to yield to the pull of the arms, 2 and 3, and to extend or draw out to the approximately straight form shown in Fig. 2.

The fender is held withdrawn in folded position, and is released by suitable mechanism, which will be presently described, and when released is automatically thrust forward by means of coil-springs, 15, one on each side of the vehicle, engageable with the neighboring carriage, 5, said spring encircling a rod, 16, mounted at its rear end upon the neighboring side bar, 8, and passing freely through an aperture in the carriage.

The carriages, 5, are withdrawn rearwardly to withdraw and fold the fender, by means of a pair of cables, 17 and 18, the cable, 17, passing over a friction pulley, 19, to a drum, 20, and the cable, 18, passing over friction pulleys 21 and 22, to said drum, both cables being wound upon the drum in the same direction.

The drum, 20, is rotatively mounted upon a horizontal stud 50, fixed upon a horizontally oscillating frame, 24, the rear end of which is pivotally mounted at 25, upon a cross bar, 26, of the vehicle frame or body, the front end, 27, of said oscillating frame being slidably supported upon a cross bar, 28, of the vehicle frame or body. The drum, 20, is formed with an internal gear, 51, adapted to be engaged by a pinion, 52, fixed upon a horizontal shaft, 23, rotatively mounted in bearings in the oscillating frame, 24.

A friction pulley, 29, fixed upon the shaft, 23, is adapted to be moved into and out of frictional engagement with the fly-wheel, 30, of the engine by the swinging movements of the frame, 24, which movements are induced in one direction by a coil-spring, 31, and in the opposite direction by a cam, 32, fixed upon a rock-shaft, 33, in position to engage the front end, 27, of the oscillating frame. The rock-shaft, 33, is operated by means of a lever, 34, fulcrumed at 35 upon the oscillating frame, 24, and connected by links, 36, with a rocker arm, 37, on said rock-shaft.

By operating the lever, 34, in the proper direction, the cam, 32, will be forced into engagement with the front end, 27, of the oscillating frame to cause an oscillating movement of the frame in opposition to the spring, 31, which will force the friction pulley, 29, against the fly-wheel, 30, to transmit the rotary movement of the fly-wheel to the shaft, 23, to rotate the drum, 20, in a direction to wind the cables, 17 and 18, thereupon. A reverse or unwinding movement of the drum, 20, is prevented by means of a dog, 38, pivoted upon the bottom of the oscillating frame, 24, and actuated by a spring, 39, to engage ratchet teeth, 40, on the front side of the drum. The dog, 38, is adapted to be disengaged from the drum by an extreme forward movement of the lever, 34, beyond that necessary to release the friction pulley, 29, from engagement with the fly-wheel, 30.

The drum, 20, is provided on its front side with a cam, 41, adapted to engage the lever, 34, when the latter is in its rearmost position, and force the lever, 34, forward to an intermediate position sufficient to withdraw the friction pulley, 29, from engagement with the fly-wheel, 30, but not sufficient to release the dog, 38. The size of the drum, 20, is so proportioned to the range of movement of the carriages, 5, that a single rotation of the drum serves to fully withdraw the carriages, 5, and the fender. The lever, 34, plays in a slot, 42, in the floor or dashboard of the vehicle, one of the walls of which slot is formed with three seats, 43, 44, and 45, adapted to engage the lever in the respective three positions; and the lever is yieldingly held in such engagement by means of a spring, 46, interposed between the lever and the opposite wall of the slot, 42. The lever, 34, is formed with a handle, 47, whereby it may be drawn rearwardly; and with a foot-rest, 48, whereby it may be pushed forward. The lever, 34, normally occupies its mid-position.

When it is desired to spread the fender, the lever is forced by either the hand or foot of the driver to its foremost position which causes the disengagement of the dog, 38, from the drum, leaving the carriages, 5, free to respond to the thrust of the springs, 15, which instantly force the carriages forward to the limit of their movement, permitting the fender to be spread by the springs, 10, as above described. When it is desired to withdraw and fold the fender, the lever, 34, is drawn to its rearmost position by the handle, 47, which forces the friction pulley, 29, into operative engagement with the fly-wheel, 30, causing the cables, 17 and 18, to be wound upon the drum, and the carriages, 5, to be withdrawn rearwardly and the fender arms, 2 and 3, to be folded. Upon the completion of the rotation of the drum, the cam, 41, will automatically shift the lever, 34, from its rearmost position to mid-position which discontinues the winding movement of the shaft, 23, and leaves the drum under the control of the dog, 38, until the lever, 34, is again forced to its foremost position.

What I claim as new and desire to secure by Letters Patent is—

1. The combination with a wheeled vehicle, of a foldable fender, comprising a foldable shield, and shield-supporting pivotally connected arms adapted to be folded substantially parallel with each other and to be unfolded to extend said shield across the angle between the arms; a pair of longitudinal tracks mounted upon opposite sides of the vehicle; a carriage upon which a pair of said arms is pivotally mounted movable along each of said tracks; spring-mechanism for moving said carriages forward when released; automatic means for spreading said arms when moved forward; automatic means for folding said arms together when moved rearward; cables connected with the respective carriages to draw the same rearward; means for taking up said cables; and means for releasing said cables.

2. The combination with a wheeled vehicle of a foldable fender, comprising a foldable shield, and shield-supporting pivotally connected arms adapted to be folded substantially parallel with each other and to be unfolded to extend said shield across the angle between the arms; a pair of longitudinal tracks mounted upon opposite sides of the vehicle; a carriage upon which a pair of said arms is pivotally mounted movable along each of said tracks; spring-mechanism for moving said carriages forward when released; automatic means for spreading said arms when moved forward;

automatic means for folding said arms together when moved rearward; cables connected with the respective carriages to draw the same rearward; a drum upon which said cables are wound; means for rotating said drum to wind the cables thereupon; a detent for preventing an unwinding movement of the drum; and means for releasing said detent.

3. The combination with a wheeled vehicle having an engine-driven wheel, of a fender movable longitudinally of the vehicle; spring-mechanism for moving the fender forward; cable-mechanism for withdrawing the fender; a drum upon which the cable-mechanism is wound; a drum-operating shaft; a bearing support for said drum-operating shaft movable toward and from said engine-driven wheel; a friction pulley on said drum-operating shaft movable with said shaft into and out of engagement with said engine-driven wheel; means for moving said bearing-support toward and from the engine-driven wheel; and a releasable detent to prevent an unwinding movement of the drum.

4. The combination with a wheeled vehicle having an engine-driven wheel, of a fender movable longitudinally of the vehicle; spring-mechanism for automatically moving the fender forward when released; cable-mechanism for withdrawing the fender; a drum upon which said cable-mechanism is wound; a friction pulley operatively connected with said drum movable into and out of engagement with said engine-driven wheel; a releasable detent for preventing an unwinding movement of the drum; lever-mechanism operative in one direction to move said pulley into engagement with said engine-driven wheel, and in the opposite direction to release said detent; and means automatically engageable with said lever-mechanism upon the completion of a predetermined winding movement of the drum whereby said friction pulley is disengaged from the engine-driven wheel.

5. A fender comprising two pair of arms, one of each pair movable toward and from the other thereof, self-folding spring-connections between the ends of each pair of arms, and a foldable shield supported by said spring-connections.

In testimony whereof, I have hereunto set my hand this 16th day of June, 1913.

GEORGE A. VAN VORST.

Witnesses:
 ROSE A. LEDUC,
 GERTRUDE M. PITZ.

Copies of this patent may be obtained for five cents each, by addressing the " Commissioner of Patents, Washington, D. C."